United States Patent
Hicks et al.

(10) Patent No.: US 8,196,098 B2
(45) Date of Patent: Jun. 5, 2012

(54) SYSTEM AND METHOD FOR EXECUTING TEMPORARY PROCESSING AGENTS

(75) Inventors: Scott D. Hicks, Underhill Center, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1675 days.

(21) Appl. No.: 11/324,877

(22) Filed: Jan. 3, 2006

(65) Prior Publication Data

US 2007/0157189 A1   Jul. 5, 2007

(51) Int. Cl.
*G06F 9/44*   (2006.01)
(52) U.S. Cl. .................... 717/114; 717/110; 717/115
(58) Field of Classification Search .................. 717/114, 717/110, 115
See application file for complete search history.

(56) References Cited

U.S. PATENT DOCUMENTS

| | | | | |
|---|---|---|---|---|
| 5,708,811 A * | 1/1998 | Arendt et al. | ................ | 717/163 |
| 5,752,032 A * | 5/1998 | Keller et al. | ................ | 719/311 |
| 5,764,974 A * | 6/1998 | Walster et al. | ................ | 707/6 |
| 6,112,025 A * | 8/2000 | Mulchandani et al. | ....... | 719/331 |
| 6,182,278 B1 * | 1/2001 | Hamada et al. | ............... | 717/107 |
| 6,339,839 B1 * | 1/2002 | Wang | ........................... | 717/146 |
| 6,907,597 B1 * | 6/2005 | Mamona et al. | ............. | 717/121 |
| 7,627,851 B2 * | 12/2009 | Lotter | ........................... | 717/106 |
| 2002/0066072 A1 * | 5/2002 | Crevatin | ...................... | 717/104 |
| 2003/0046673 A1 * | 3/2003 | Copeland et al. | ............ | 717/163 |
| 2004/0044990 A1 * | 3/2004 | Schloegel et al. | ............ | 717/113 |

\* cited by examiner

*Primary Examiner* — Li Zhen
*Assistant Examiner* — Hang Pan
(74) *Attorney, Agent, or Firm* — Schmeiser, Olsen & Watts; John R. Pivnichny

(57) ABSTRACT

A system for managing temporary processing agents. A first code routine is provided as an empty routine in an agent including first executable code, the empty routine consisting of non-executable code. A programming component selectively loads second executable code to the first routine for converting the empty routine to a populated routine. A code element issues a call to the first routine. An agent execution component is responsive to the first routine being a populated routine for executing the second executable code.

18 Claims, 5 Drawing Sheets

SYSTEM AND METHOD FOR EXECUTING TEMPORARY PROCESSING AGENTS

CROSS REFERENCES TO RELATED APPLICATIONS

Copending U.S. patent application Ser. No. 11/258,659, entitled "SYSTEM AND METHOD FOR CONTROLLING THE SCOPE OF SCRIPT LIBRARY CODE" filed Oct. 26, 2005 is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention relates to processing agents. More particularly, it relates to the use of short-lived, on-demand processing agents within scheduled processing agents.

2. Background Art

There is a need in the art for a system and method for managing a pervasive agent that must be run on demand, either once or multiple times over a defined period. This agent may need to run daily, weekly, or as part of end-user adhoc processing. Such pervasive agents need to run in a controlled and/or sequenced manner to avoid conflicts and unintended side effects. Pervasive agents are broad in scope in terms of data affected and must be controlled and sequenced in proper logical order, else conflicts and unintended side effects, such as overlapping and overwriting each other's work, occur.

SUMMARY OF THE INVENTION

A system, method, and computer program product for managing temporary processing agents by providing a first routine as an empty routine in an agent including first executable code, the empty routine consisting of non-executable code; selectively loading second executable code to the first routine, converting the empty routine to a populated routine; operating a code element to issue a call to the first routine; responsive to the first routine being a populated routine, executing the second executable code; and returning control to the code element.

Other features and advantages of this invention will become apparent from the following detailed description of the presently preferred embodiment of the invention, taken in conjunction with the accompanying drawings.

DETAILED DESCRIPTION OF THE BEST MODE

Figure 1:
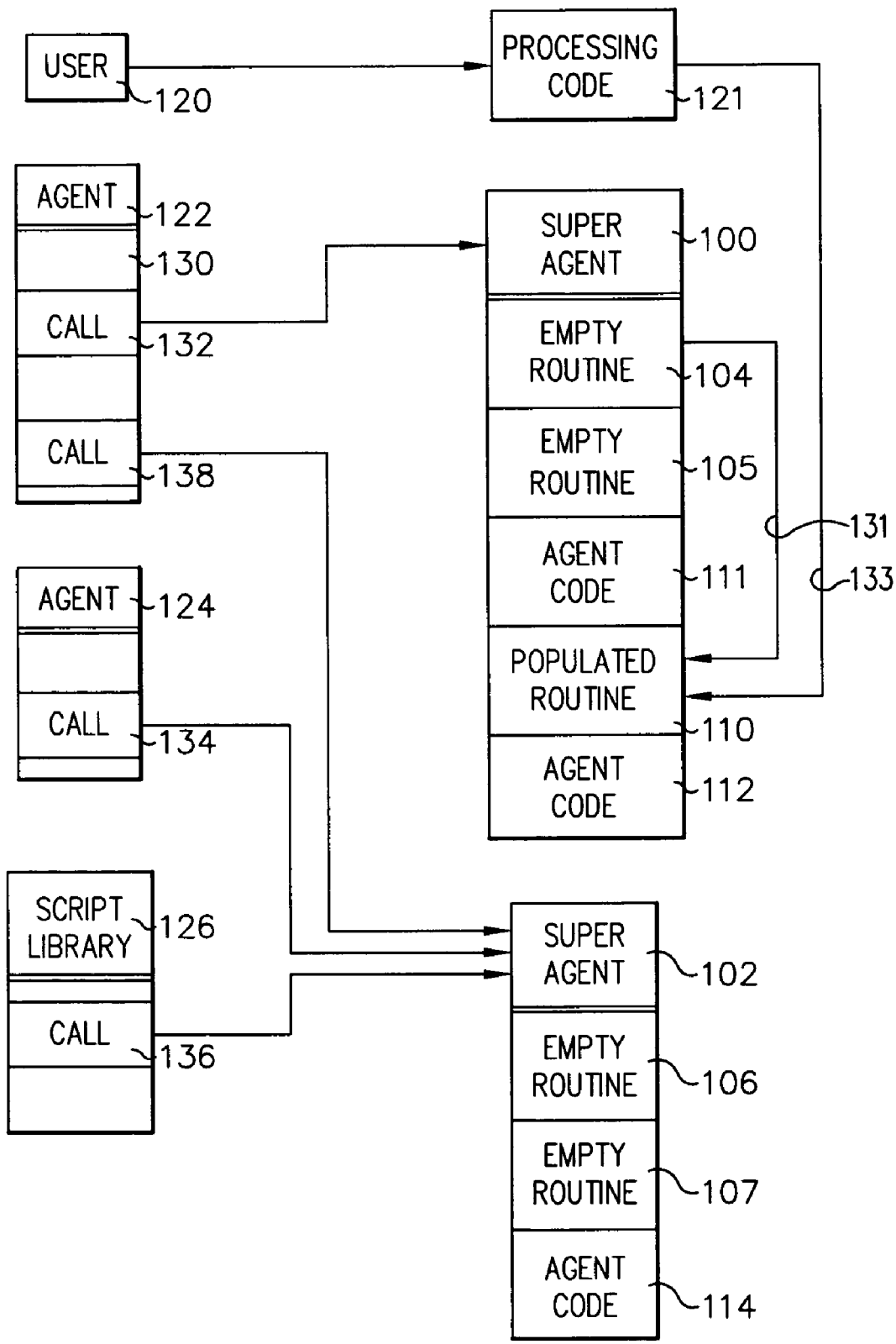
FIG. 1 is a high level logic diagram illustrating calls to super agents containing empty and populated routines in accordance with a first embodiment of the invention.
Figure 2:
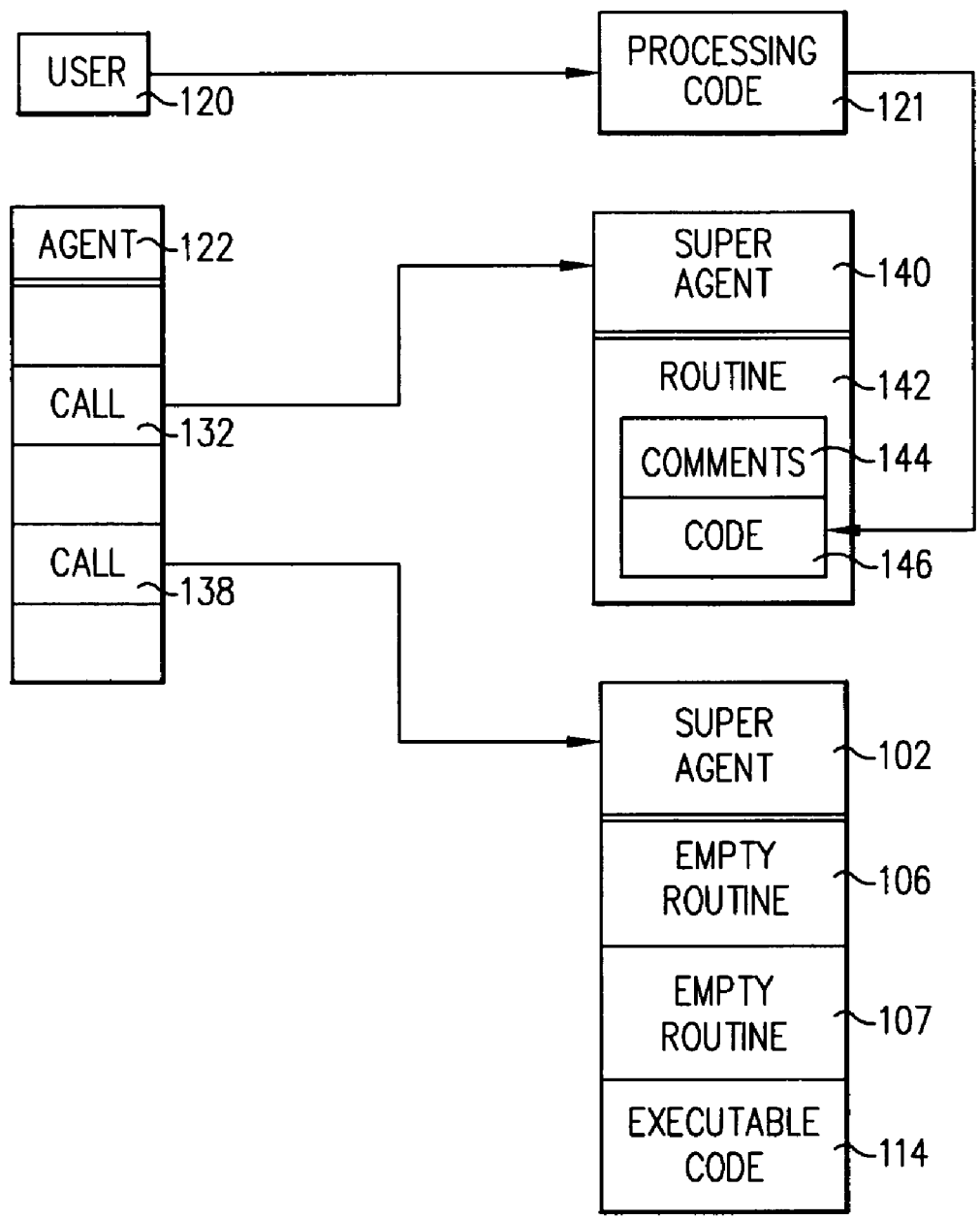
FIG. 2 is a high level logic diagram illustrating calls to super agents containing empty routines and executable code in accordance with a second exemplary embodiment of the invention.

Referring to FIGS. 1 and 2, in accordance with a preferred embodiment of the invention, short-lived on-demand processing agents 100, 102 execute responsive to calls 132, 138 from within a scheduled processing agent 122.

In accordance with preferred embodiments of the present invention, a series of generic on-demand processing agents 100, 102 are provided which have calls 132, 134, 136, 138 to them strategically embedded within script libraries 126 and other agents 122, 124.

These generic on-demand processing agents 100, 102 normally run when called and do nothing at all when populated only with empty routines 104, 105, 106, 107. Alternatively, call 132 to agent 100 may include agent code 111, 112 which does run when agent 100 is called. Thus, in this situation, agent 100 is a super agent. A super agent 100 is an agent including executable code which may include within it other agents which may be called from code internal or external to the super agent. However, such as when adhoc or 'on-demand' processing is required, these agents 100 may have a normally empty routine 104 loaded with processing code 121 to become a populated routine 110 that continues to run as long as needed. This varies from application to application (and project to project) and is at the discretion of the project manager, customer, and database programmer.

Call 132 is shown directed to super agent 100, which includes agent code 111, 112 and will normally result in executing agent code 111 and 112. If empty routine 104 has been populated with code 121 to become populated routine 110 and repositioned as shown in sequential order between agent code elements 111 and 112, a call 132 to super agent 100 will result in execution of code 111, 110, and 112, in that order.

Figure 4:
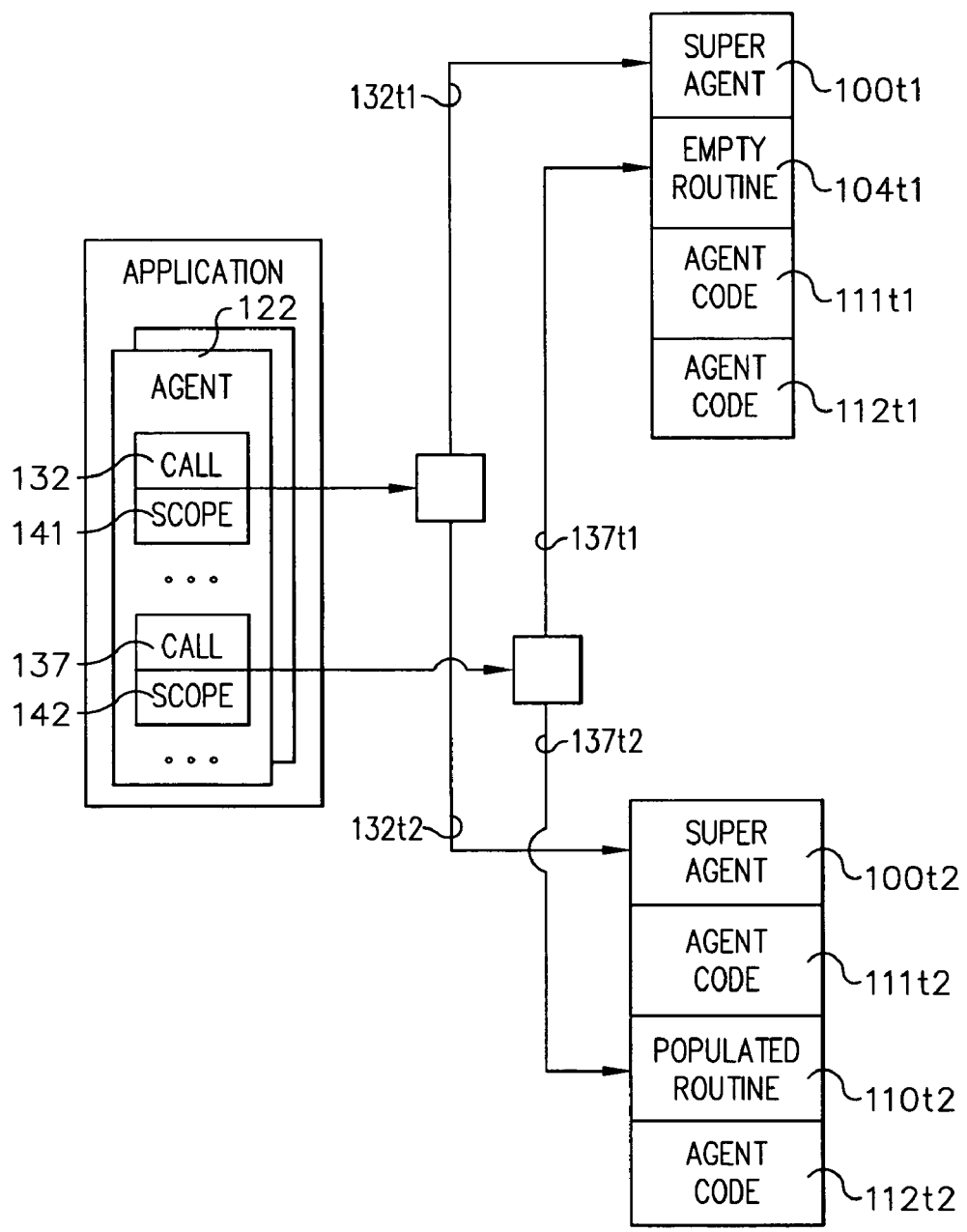
FIG. 4 is a high level logic diagram illustrating calls to empty and populated routines within super agents.

Referring to FIG. 4, super agent 100 is shown at successive times t1 and t2. Empty routine 104*t*1 is populated and repositioned between agent code 111*t*2 and 112*t*2 as populated routine 110*t*2. A call 132 is directed as is represented by line 132*t*1 to super agent 100*t*1 at time t1, and to super agent 100*t*2 at time t2. Call 137 is directed to empty routine 104*t*1 as is represented by line 137*t*1 at time t1, resulting in no processing occurring, and will be directed to populated routine 110*t*2 as is represented by line 132*t*2 resulting in processing of the executable code just in routine 110*t*2. A call 132*t*1 to super agent 100*t*1 will result in sequential execution of agent code 111*t*1 and 112*t*1, and a call 132*t*2 to super agent 100*t*2 will result in sequential execution of code 111*t*2, 110*t*2 and 112*t*2.

A call 132 which is "strategically embedded" is a call which provides improved maintainability and reliability of an overall system by being placed in its proper logical location within the code 130 of the calling application 122. Such calls are placed by the programmer to guarantee proper sequential execution. Similarly, populated routines may be repositioned strategically within agent code so as to execute in proper logical order.

In an exemplary embodiment of the invention, an Ethernet migration (EMM) project requires that update processing be done, sometimes weekly, sometimes daily, and sometimes on some other schedule or on demand (adhoc). Under some circumstance, it may be required to change the processing (such as update) rules and that will require that code 121 be executed which has not previously been written but under conditions (such as monthly, or nightly, and so forth) which are the same as other agents or routines within super agent 100.

In this example, a block of code which does nothing, that is, an empty routine 104, 105 is created and preferably positioned at the top of the agent 100, and then moved to a logical location between code 111 and 112 in the agent code 100 when populated with code 121 to be executed in response, for example, to on-demand, or ad-hoc, processing (for example, call 132). An empty routine is a separate program or agent that is normally devoid of executable code, containing only comments, and is called by another agent.

When it is needed to execute some new processing code 121, an empty routine 104 is selected by the user 120 (programmer) and populated with the code required for executing a new processing requirement. A response to a request for new on-demand processing, for example, is coded into an empty routine 104, and then strategically embedded into the agent by moving that routine into a logical position 110, as is represented by line 131.

In accordance with copending application Ser. No. 11/258,659, this newly populated routine 110 is enabled by passing scope based parameters in call 132, which are used to define which functions and procedures are executed. In this manner, the new routine 110 is isolated, controlled, and stable in that it integrates within the balance of the program 111, 112 a routine 110 which is isolated and identified, in this example, as run-once-on-demand code.

In the event that the new routine 110 is not removed from the agent 100, it will not execute when at least one prerequisite condition (such as may defined by a scope based parameter passed to routine 110 in call 132) is not met.

In accordance with an exemplary embodiment of the invention, a newly populated routine is enabled, isolated, and controlled by the agent being scheduled and enabled for execution with a Lotus Notes Designer application.

Referring now to FIG. 2 in connection with Tables 1 and 2, an agent 122 includes code for initializing an adhoc only super agent information update (agent) 140. In this example Table 1 shows a call at lines 31 and 32 to "AGNT:On Demand Processing", which is Table 2 before being populated with executable code, and as Table 3 thereafter, lines and 4-34.

TABLE 1

ADHOC ONLY: EMM SUPER AGENT INFORMATION UPDATE (AGENT4): INITIALIZE

| | |
|---|---|
| 01 | ADHOC ONLY: EMM Super Agent Information Update(Agent):Initialize |
| 02 | Sub Initialize |
| 03 | 'Declarations |
| 04 | Dim session As New NotesSession |
| 05 | Dim this_db As NotesDatabase |
| 06 | Dim config_view As NotesView |
| 07 | Dim config_doc as NotesDocument |
| 08 | Dim collection As NotesDocumentCollection |
| 09 | Dim server As String |
| 10 | Dim pathFN As String |
| 11 | 'Initializations |
| 12 | Set this_db - session.CurrentDatabase |
| 13 | Set config_view = this_db.GetView("LookupAgentSettings") |
| 14 | Call config_view.Refresh |
| 15 | Set collection = config_view.GetAllDocumentsByKey ("ADHOC AGNT:Weekly Agent Group") |
| 16 | Set config_doc = collection.GetFirstDocument |
| 17 | 'Loop through all active configuration documents |
| 18 | While Not(config_doc is Nothing) |
| 19 | 'Get server and pathname from config |
| 20 | server=config_doc.ServerName(0) |
| 21 | If server = "" Then |
| 22 | pathFN=config_doc.LocalDatabasePathFN2(0) |
| 23 | Else |
| 24 | pathFN=config_doc.DatabasePathFN2(0) |
| 25 | End If |
| 26 | 'Open the database and run the proper agent |
| 27 | Dim instance_db As New NotesDatabase("","") |
| 28 | Dim instance_agent As NotesAgent |
| 29 | Dim instance_agent2 As NotesAgent |
| 30 | Call instance_db.Open(server,pathFN) |
| 31 | Set instance_agent2 = instance_db.GetAgent("AGNT:On Demand Processing") |

TABLE 1-continued

ADHOC ONLY: EMM SUPER AGENT INFORMATION UPDATE (AGENT4): INITIALIZE

| | |
|---|---|
| 32 | Call instance_agent2.Run |
| 33 | 'Set instance_agent = instance_db.GetAgent ("AGNT:Weekly Agent Group") |
| 34 | 'Call instance_agent.Run |
| 35 | Call instance_db.Close |
| 36 | Set config_doc = collection.GetNextDocument (config_doc) |
| 37 | Wend |
| 38 | End Sub |

TABLE 2

AGENT3: EMPTY ROUTINE

| | |
|---|---|
| 01 | AGNT:On Demand Processing(Agent):Initialize |
| 02 | Sub Initialize |
| 03 | 'This agent does what it needs to, when it needs to do ' it. |

TABLE 3

AGENT3: POPULATED WITH EXECUTABLE CODE FOR ON DEMAND PROCESSING

| | |
|---|---|
| 01 | AGNT:On Demand Processing(Agent):Initialize |
| 02 | Sub Initialize |
| 03 | 'This agent does what it needs to, when it needs to do ' it. |
| 04 | Dim VN_session as New NotesSession |
| 05 | Dim VW_EMMlookup As NotesView 'Above added for script library |
| 06 | Dim VW_EMMlookup2 as NotesView 'Above added for script library |
| 07 | Dim DB_EMM As NotesDatabase |
| 08 | Dim DOC_EMM As NotesDocument |
| 09 | Set DB_EMM=VN_session.CurrentDatabase |
| 10 | Set VW_EMMlookup = DB_EMM.GetView("VW_LookupMachines") |
| 11 | Set VW_EMMlookup2 = DB_EMM.GetView("VW_LookupPrinters") |
| 12 | Set VW_EMMlookup3 = DB_EMM.GetView("VW_LookupPorts") |
| 13 | Call VW_EMMlookup.Refresh |
| 14 | Call VW_EMMlookup2.Refresh |
| 15 | Call VW_EMMlookup3.Refresh |
| 16 | Set DOC_EMM=VW_EMMlookup.GetFirstDocument |
| 17 | While Not(DOC_EMM Is Nothing) |
| 18 | Set VN_tempdoc=VW_EMMlookup.-GetNextDocument(DOC_EMM) |
| 19 | If Cstr(DOC_EMM.FN_EthernetDate(0))<> "" Then |
| 20 | DOC_EMM.FN_EthernetDate=Cdat (DOC_EMM.FN_EthernetDate(0) |
| 21 | End If |
| 22 | Call DOC_EMM.Save(True,False,True) |
| 23 | Set DOC_EMM=VN_tempdoc |
| 24 | Wend |
| 25 | Set DOC_EMM=VW_EMMloookup2.GetFirstDocument |
| 26 | While Not (DOC_EMM is Nothing) |
| 27 | Set VN_tempdoc=VWK_EMMlookup2.-GetNextDocument(DOC_EMM) |
| 28 | If Cstr(DOC_EMM.FN_EthernetDate(0) <> == Then |
| 29 | DOC_EMM.FN_EthernetDate= Cdat(DOC_EMM.FN_EthernetDate(0)) |
| 30 | End If |
| 31 | Call DOC_EMM.Save(True,False,True) |
| 32 | Set DOC_EMM=VN_tempdoc |
| 33 | Wend |
| 34 | End Sub |

Figure 3:
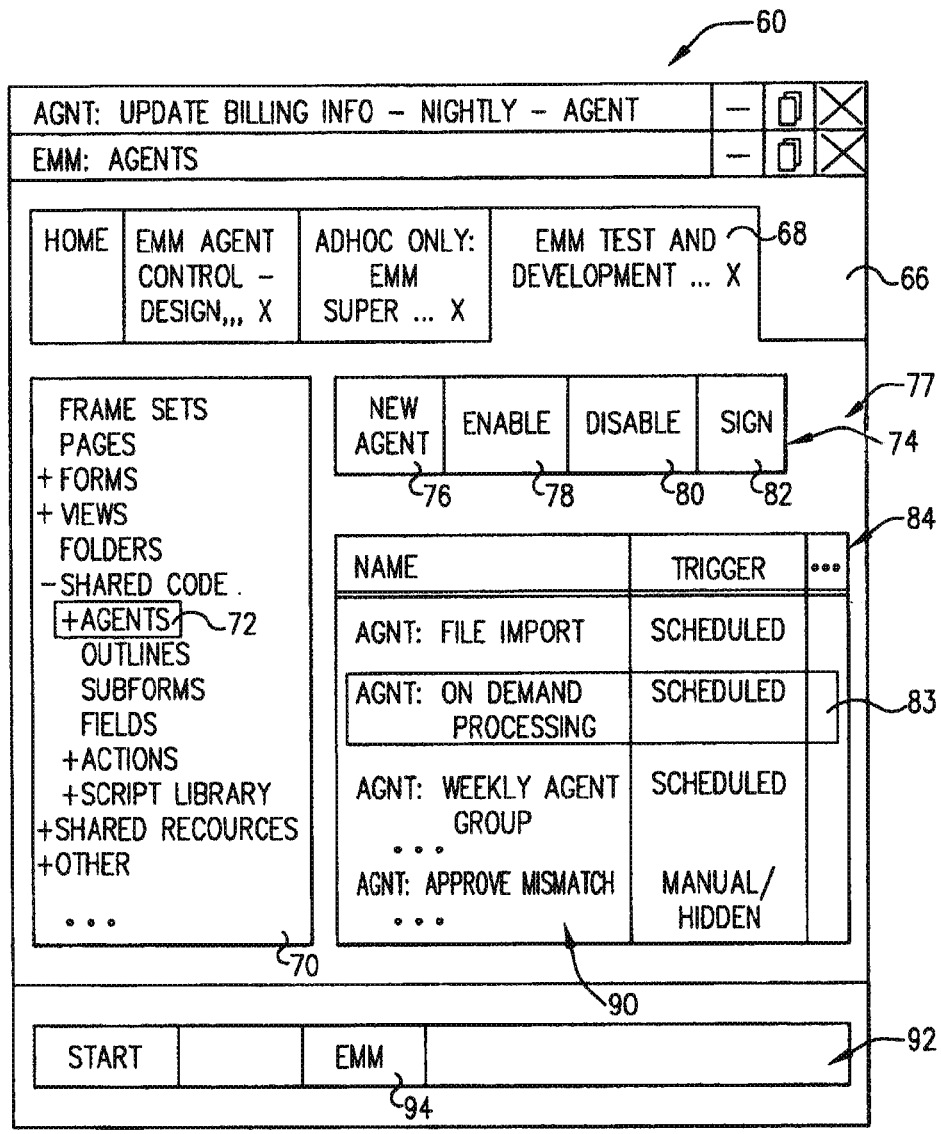
FIG. 3 is an example of a user interface of an application including agents and super agents.

Referring to FIG. 3, a user interface 60 provides to a programmer the ability to access agents and libraries for an exemplary application, thus enabling programmer 120 to populate a normally empty routine 104 with processing code 121.

Selection of button 94 from application bar 92 brings up under tab 68 table of contents (TOC) 70. Selection of agents 72 from TOC 70 brings into window 60 tool bar 74 and agent listing 90, with field headings 84 identifying agent name and triggers (scheduled, manual/hidden, and so forth) for the agents in the application. Tool bar 74 provides new agent 76, enable 78, disable 80 and sign 82 processes for selection by a user in working with a selected application 68. Selection of agent 83 will load to the UI 60, in this example, the material set forth above in Table 2, which programmer 120 may then work with to populate an empty routine 104 with processing code 121 as previously described.

Figure 5:
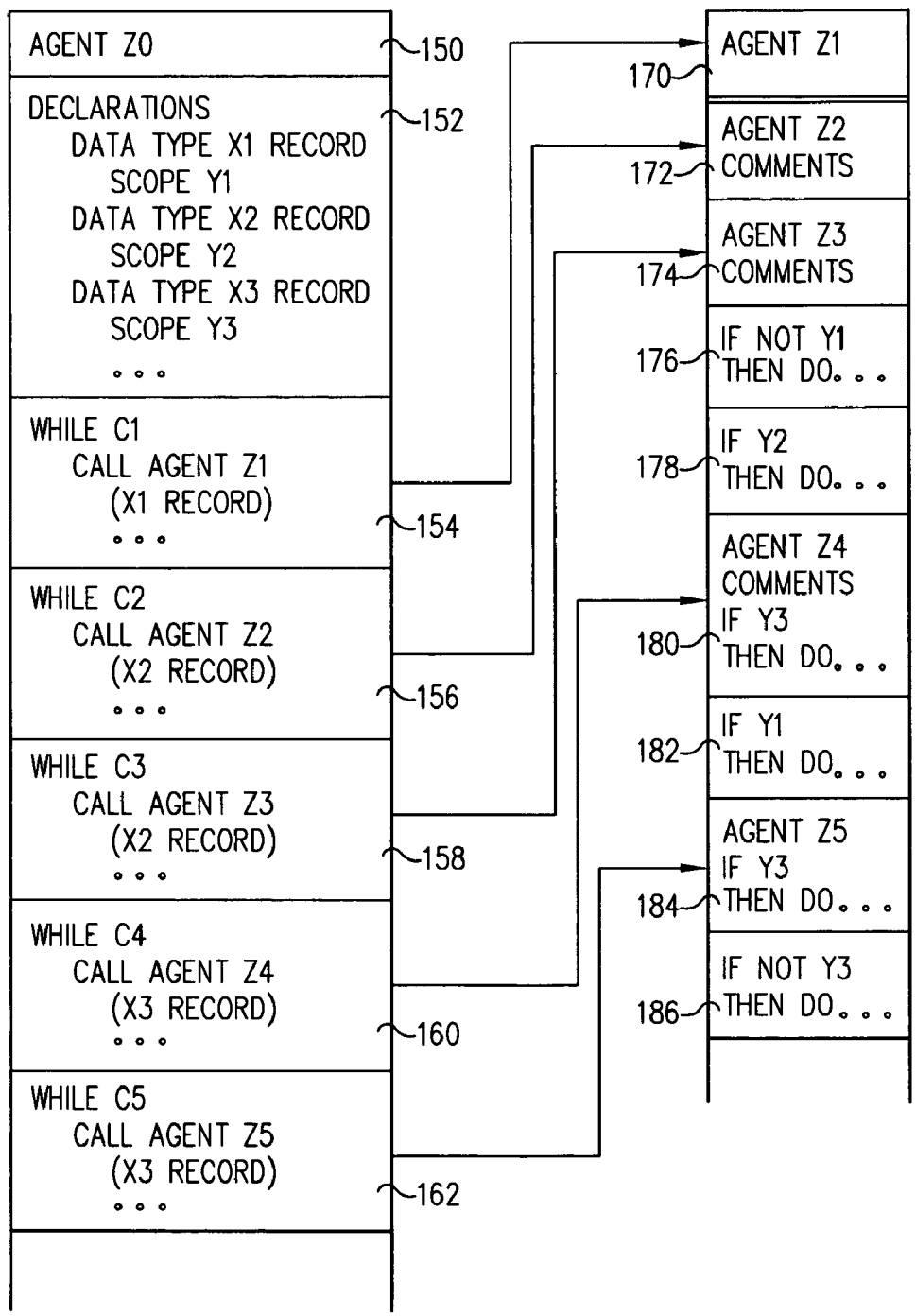
FIG. 5 is a schematic representation of agent code showing calls to empty and populated routines within a super agent.

Referring to FIG. 5, several calls are illustrated from agent Z0 150 to super agent Z1 170. Agent Z0 150 includes declarations code 152, and calls C1 154, C2 156, C3 158, C4 160, and C5 162 to agent Z1 170, agent Z2 172, agent Z4 180, and agent Z5 186, respectively. Declarations 152 set up datatypes X1 Record including a scope parameter Y1, X2 Record including a scope parameter Y2, and X3 Record including a scope parameter Y3. Agent Z2 172 and Agent Z3 174 are examples of empty routines including only comments, and no executable code. Calls 158 and 160 from agent Z0 150 to agents Z2 172 and Z3 174 will result in no processing. Agents Z4 180 and Z5 184 are examples of normally empty routines which have been populated by executable code such that a call 160 to agent Z4 180 and call 162 to agent Z5 184 will result in execution of code identified by their IF/THEN statements subject to scope Y3 being true. Code segments 176, 178, 182, 186 are examples of agent Z1 code that will execute or not based upon scope parameters Y1, Y2, and Y3 testing true or not true in their respective IF/THEN statements. Agent Z4 180 and Z5 184 code has been strategically positioned within Agent Z1 170 code segments 178, 182, 186, such that a call 154 to super agent Z1 170 will result in code 176, 178, 180, 182, 184, 186 executing in sequence subject to their respective scope parameters evaluating true.

Advantages Over the Prior Art

It is an advantage of the invention that there is provided an improved system and method for processing scheduled agents.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a non-transitory computer-readable medium providing program code for use by or in connection with a computer or any instruction execution system. For the purposes of this description, a non-transitory computer-readable medium can be any apparatus that can store the program for use by or in connection with the instruction execution, system, apparatus, or device.

The medium can be an electronic, magnetic, optical, electromagnetic, or semiconductor system (or apparatus or device). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A method for managing temporary processing agents, comprising:
    providing a super agent comprising first agent code that includes first executable code, third agent code that includes third executable code and is located contiguous to the first agent code within a contiguous space within the super agent, and an empty routine consisting of non-executable code in a first space within the super agent external to the contiguous space;
    after said providing the super agent, selectively loading second executable code into the empty routine, converting said empty routine to a populated routine in the first space;
    after said populating, repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code;
    after said repositioning, said super agent receiving the call from the code element;
    responsive to said receiving the call from the code element, said super agent executing code comprising, and in a sequential ordering of, the first executable code, the second executable code, and the third executable code; and
    said super agent returning control to said code element.

2. The method of claim 1, said super agent being a generic on-demand processing agent.

3. The method of claim 1, said code element providing in said call a scope parameter.

4. The method of claim 3, said scope parameter defined in a data type created by said code element to include said scope parameter and other parameters.

5. The method of claim 4, said second executable code including an IF/THEN routine responsive to said scope parameter for determining whether to execute a portion of said second executable code defined by said IF/THEN routine.

6. The method of claim 1, wherein said method comprises:
providing a user interface to a programmer, said presented user interface comprising a window that includes an application bar;
responsive to selection by the programmer of a button in the application bar, displaying a table of contents in the window concurrently with the application bar, said table of contents listing a plurality of options for selection by the programmer;
responsive to selection by the programmer of an agents option in the table of contents, displaying a listing of agents in the window concurrently with the application bar and the table of contents; and
responsive to selection by the programmer of an agent specific to the second executable code in the listing of agents, displaying the second executable code in the window and subsequently receiving said second executable code from the programmer to perform said selectively loading said second executable code into said empty routine which results in said converting said empty routine to said populated routine in the first space.

7. A computer program product, comprising a computer readable storage device having computer readable program instructions stored therein, said computer readable program instructions configured to be executed by a processor of a computer system to implement a method for managing temporary processing agents, said method comprising:
providing a super agent comprising first agent code that includes first executable code, third agent code that includes third executable code and is located contiguous to the first agent code within a contiguous space within the super agent, and an empty routine consisting of non-executable code in a first space within the super agent external to the contiguous space;
after said providing the super agent, selectively loading second executable code into the empty routine, converting said empty routine to a populated routine in the first space;
after said populating, repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code;
after said repositioning, said super agent receiving the call from the code element;
responsive to said receiving the call from the code element, said super agent executing code comprising, and in a sequential ordering of, the first executable code, the second executable code, and the third executable code; and
said super agent returning control to said code element.

8. The computer program product of claim 7, said super agent being a generic on-demand processing agent.

9. The computer program product of claim 7, said code element providing in said call a scope parameter.

10. The computer program product of claim 9, said scope parameter defined in a data type created by said code element to include said scope parameter and other parameters.

11. The computer program product of claim 10, said second executable code including an IF/THEN routine responsive to said scope parameter for determining whether to execute a portion of said second executable code defined by said IF/THEN routine.

12. The computer program product of claim 7, wherein said method comprises:
providing a user interface to a programmer, said presented user interface comprising a window that includes an application bar;
responsive to selection by the programmer of a button in the application bar, displaying a table of contents in the window concurrently with the application bar, said table of contents listing a plurality of options for selection by the programmer;
responsive to selection by the programmer of an agents option in the table of contents, displaying a listing of agents in the window concurrently with the application bar and the table of contents; and
responsive to selection by the programmer of an agent specific to the second executable code in the listing of agents, displaying the second executable code in the window and subsequently receiving said second executable code from the programmer to perform said selectively loading said second executable code into said empty routine which results in said converting said empty routine to said populated routine in the first space.

13. A system comprising a processor and a computer readable memory unit coupled to the processor, said memory unit containing program instructions configured to be executed by the processor to implement a method for managing temporary processing agents, said method comprising:
providing a super agent comprising first agent code that includes first executable code, third agent code that includes third executable code and is located contiguous to the first agent code within a contiguous space within the super agent, and an empty routine consisting of non-executable code in a first space within the super agent external to the contiguous space;
after said providing the super agent, selectively loading second executable code into the empty routine, converting said empty routine to a populated routine in the first space;
after said populating, repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code;
after said repositioning, said super agent receiving the call from the code element;
responsive to said receiving the call from the code element, said super agent executing code comprising, and in a sequential ordering of, the first executable code, the second executable code, and the third executable code; and
said super agent returning control to said code element.

14. The system of claim 13, said super agent being a generic on-demand processing agent.

15. The system of claim 13, said code element further for providing in said call a scope parameter.

16. The system of claim 15, said scope parameter defined in a data type created by said code element to include said scope parameter and other parameters.

17. The system of claim 16, said second executable code including an IF/THEN routine responsive to said scope parameter for determining whether to execute a portion of said second executable code defined by said IF/THEN routine.

18. The system of claim 13, wherein said method comprises:
- providing a user interface to a programmer, said presented user interface comprising a window that includes an application bar;
- responsive to selection by the programmer of a button in the application bar, displaying a table of contents in the window concurrently with the application bar, said table of contents listing a plurality of options for selection by the programmer;
- responsive to selection by the programmer of an agents option in the table of contents, displaying a listing of agents in the window concurrently with the application bar and the table of contents; and
- responsive to selection by the programmer of an agent specific to the second executable code in the listing of agents, displaying the second executable code in the window and subsequently receiving said second executable code from the programmer to perform said selectively loading said second executable code into said empty routine which results in said converting said empty routine to said populated routine in the first space.

* * * * *